March 11, 1952     H. U. GARRETT     2,588,715
DIFFERENTIAL FLOW VALVE
Filed March 27, 1947
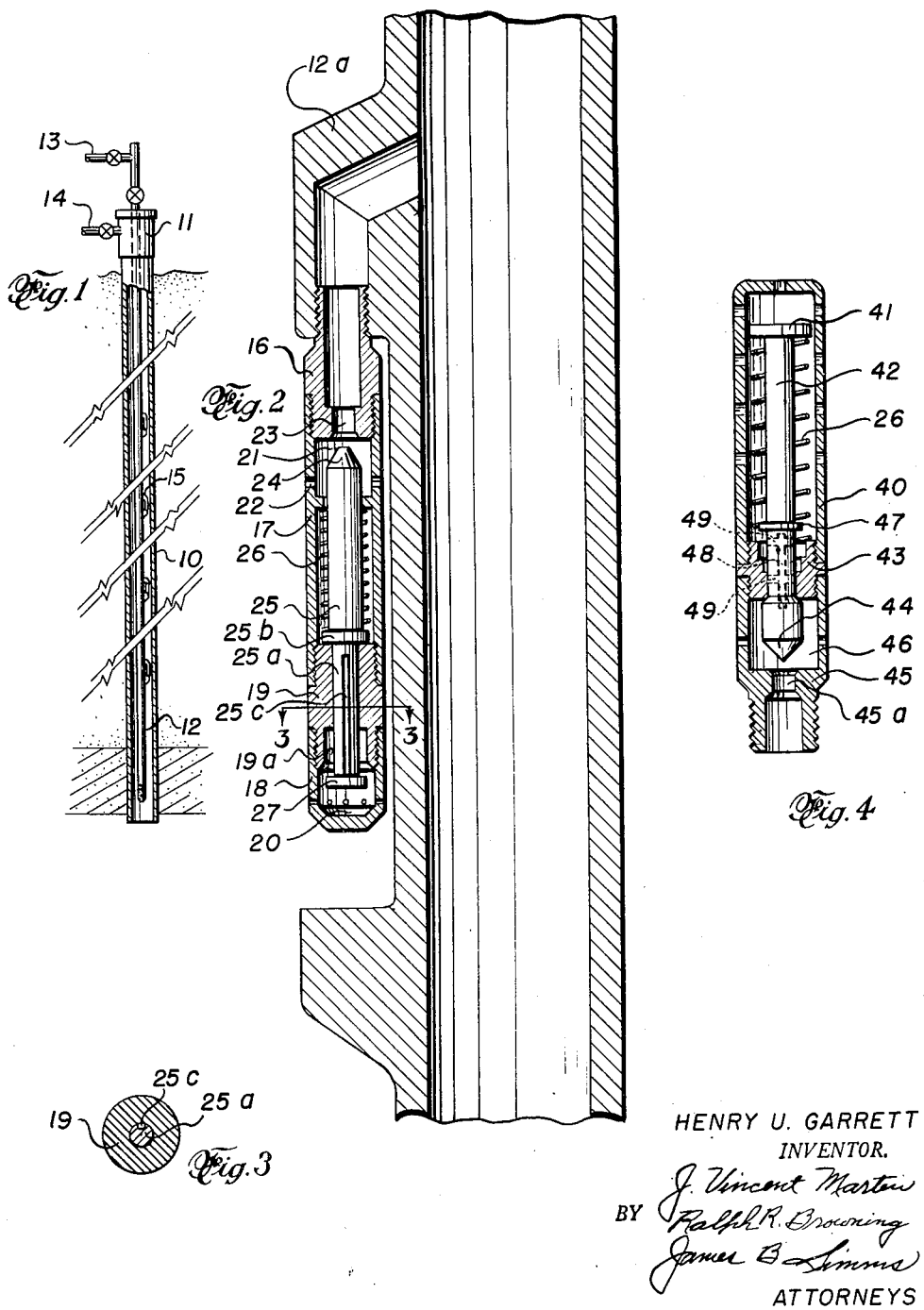
HENRY U. GARRETT
INVENTOR.
BY
ATTORNEYS Patented Mar. 11, 1952

2,588,715

UNITED STATES PATENT OFFICE 2,588,715

DIFFERENTIAL FLOW VALVE

Henry U. Garrett, Longview, Tex., assignor to Garrett Oil Tools, Inc., Houston, Tex., a corporation of Texas Application March 27, 1947, Serial No. 737,599

12 Claims. (Cl. 137—153)

This invention relates to improvements in valves and refers more particularly to valves of the type adapted to close automatically when the flow through the valves exceeds a predetermined rate.

Valves of this character have many uses and are especially adapted for use in conjunction with gas lift operations in the production of oil or other well liquids. By way of illustration and not by way of limitation the description of the invention will be directed to the adaptation of the valves in gas lift operations.

In such valves it is desirable that the valve members close with a snap action upon occurrence of predetermined flow conditions through the valve. Although this snap action is desirable the rate of closing of the valve should be controlled so that the valve member is not hammered upon the seat in operation for this is likely to distort either the seat or valve member and result in valve failure.

Valves of this type should be sensitive in their operation. However, in use a flow condition often times exists for a fraction of a second due to surges, pulsations and the like. Best results require that the valve close only after the occurrence of predetermined flow conditions for a small but finite time period to reduce the likelihood of accidental closing of the valve.

An object of this invention is to provide a differential flow valve which closes positively with a snap action upon the occurrence of predetermined flow conditions.

Another object is to provide a differential flow valve in which the snap action closing of the valve member is controlled as to rate to protect the valve member and seat from hammering and other shock.

A further object is to provide a differential flow valve which will close with a snap action only upon occurrence of predetermined flow conditions over a very short but finite time period.

Other and further objects of this invention will appear from the following description.

In the accompanying drawings which form a part of the instant specification and are to be read in conjunction therewith and wherein like reference numerals are used to indicate like parts in the various views;

Fig. 1 is a schematic view partially in section and partially in elevation illustrating a producing oil well wherein the string of flow tubing is equipped with valves embodying this invention;

Fig. 2 is an enlarged sectional view through a portion of the string of flow tubing and one of the valves shown in Fig. 1 and showing the valve embodying this invention in detail;

Fig. 3 is a view taken along the line 3—3 in Fig. 2 in the direction of the arrows; and Fig. 4 is a sectional view of a modified valve embodying this invention.

Referring to the drawings, numeral 10 designates the oil string of casing within a well bore equipped with a well head 11 adjacent the ground surface. Extending centrally within the casing is the string of flow tubing 12 having a flow connection 13 at its upper end. Leading into the well head and communicating with the annulus between the casing and tubing strings is a pipe 14 for supplying gas under pressure to the casing tubing annulus. A plurality of differential flow valves 15, embodying this invention, are mounted on the string of tubing 12 for the purpose of introducing gas under pressure into the column of liquid which accumulates within the tubing all in accordance with conventional practice in aeration type gas lift operations. Usually from two to eight of these valves are sufficient but more valves may be used.

Referring to Fig. 2, it is seen that the string of flow tubing is equipped with fittings 12a at elevated intervals which threadedly receives the valve head 16 of a differential flow valve. The valve housing is completed by valve body 17 and screen cap 18 coupled together by a suitable apertured partition or nipple 19.

The interior of the valve housing is divided by the apertured partition or nipple into a pressure chamber 20 within screen cap 18 and a valve chamber 21 within the valve body 17. Chamber 21 has a plurality of radial inlet ports 22 and an outlet port 23. The outlet port has a tapered seat for receiving the tapered valve member 24.

The stem 25 carries valve member 24 at one end and has a portion of reduced diameter 25a extending through the aperture of partition 19. A means for continuously urging the valve member toward unseated position is provided by coil spring 26 encircling stem 25. One end of the spring engages an annular inturned shoulder formed in body 17 and the other end engages an annular external shoulder 25b formed on the stem. It is understood that any suitable resilient means or element may be employed for this purpose and in some instances, where the valve member and stem are to be mounted in a vertical operating position as shown in the drawings, the spring may be dispensed with, the force of gravity supplying the resilient effort urging the valve member to open position.

A motor is provided for moving the valve member against the spring toward closed position in response to the pressure differential between the valve chamber and the exterior of the housing or device. The motor includes a part, the stem portion 25a, exposed to this pressure differential with the valve member in fully open position and a second part, piston 27, of greater diameter that is subjected to this pressure differential on movement of the stem and valve member a predetermined distance from full open position toward closed position. The enlarged bore 19a of the partition provides the power cylinder for the piston, which is spaced somewhat from the cylinder with the valve fully open, but which enters the cylinder on movement of the valve member a predetermined distance toward closed position. The screen cap serves only to protect the piston, cylinder and stem from foreign matter and may be dispensed with in some instances in which case the exterior of the housing is the pressure chamber.

The valve chamber 21 and the pressure chamber 20 are effectively separated with stem 25b in its Fig. 2 position. However, means are provided for placing the valve chamber and power cylinder in communication when the stem has been advanced toward the outlet a predetermined small but finite distance. This communication is established simultaneously with the entrance of piston 27 into the power cylinder. This may be accomplished by providing a passage and closure, the closure being operable to close off the passage with the stem and valve in fully open position and operable upon movement of the stem and valve a predetermined distance from this position toward seated position to open the passage. In this embodiment this is provided by the close fitting stem and partition aperture and the groove or passage 25c in the periphery of the stem. The length of the groove is such that the cylinder and valve chambers are not in communication until the stem is moved axially toward the seat a sufficient distance to expose the groove 25c to the interior of the valve chamber. The cross sectional size of passage of 25c, or the rate of flow through the passage, is preferably controlled so that the pressure within the power cylinder defined by bore 19a will be relieved at a controlled rate providing for snap action closing of the valve member to insure a positive and quick closure of the valve, but at the same time the rate of closure is held down or damped to protect the valve member and seat against distortion from hammering or the like.

It is believed that the operation of the valve is apparent from the foregoing description. With the valve member and stem in their Fig. 2 position the valve is open and pressure exterior of the valve, that is between the casing tubing annulus of the well installation, causes a flow through radial ports 22, outlet port 23 and fitting 12a into the tubing string 12 when the pressure in the casing tubing annulus exceeds that of the tubing. It is to be understood that this condition is maintained by introduction of gas under pressure into the casing tubing annulus through line 14. When the weight of the column of well fluid within the tubing 12 above the position of any of the valves 15 lightens, the rate of flow of fluid from the annulus through the valve into the string of tubing increases. When the flow reaches a predetermined rate the pressure within the valve chamber will be reduced over that within the pressure chamber 20 or exterior of the valve housing. This pressure is active across an area equivalent to the cross sectional area of that portion of stem 25a adjacent the groove or passage 25c. When the pressure differential between the pressure chamber and valve chamber times this effective area of the stem is sufficient to overcome the resilient means, which tends to hold the valve member unseated, then the stem and valve member are advanced axially in a direction toward outlet 23. When this movement has continued to the extent that piston 27 enters the power cylinder, the end of groove 25c adjacent the valve chamber is exposed to the interior of the valve chamber and permits a relief of pressure from within the power cylinder creating a pressure differential across the piston. This provides a much greater force tending to move stem 25 in a direction to seat valve member 24 in the tapered seat of the outlet 23. As the force tending to move the stem in this direction is already sufficient to just overcome the means tending to hold the valve member unseated, this greatly increased force insures a positive closing of the valve with a snap action.

By altering the size of the passage 25c or otherwise controlling the rate of flow through the passage, the speed of closing of the valve member may be controlled. In other words, there is available a maximum force for actuating the stem, but only that part of this force is applied thereto that is required to effect a selected rate of movement of the stem and valve member. This is true as any greater rate of stem movement reduces the pressure differential across the part or piston 27 and a reduction in this rate of movement will increase the differential to which the piston is subjected. Thus, the valve is closed quickly and positively but the hammering effect on the valve member and seat may be substantially eliminated.

It is also apparent that the occurrence of a predetermined flow condition through the valve chamber so as to give rise to a pressure differential between the valve chamber and pressure chamber such as will start stem 25 to move toward seating position of the valve member will have to prevail for a sufficiently long time period to cause the passage 25c to communicate between the power cylinder and the valve chamber or the closure of the valve will not be effected. Thus, the structure provided safeguards against accidental and unwanted closure of the valve due to flow conditions brought on by surges, pulsations and the like.

Once the valve member has been closed in response to a predetermined flow condition through the valve chamber, the valve will be held closed by the pressure differential across the tapered seat and valve member 24, as along as this differential is sufficient to overcome the resilient means which urges the valve toward open position. With the valve closed the pressure within the valve chamber pressure chamber and power cylinder quickly equalize and the effective differential which holds the valve closed is that across valve member 24. Once the valve member cracks from its seat all forces opposing the resilient element or spring 26 are substantially eliminated and the valve member and stem assume their Fig. 2 position. Then flow of gas again occurs into the string of tubing and will continue until the column of fluid within the tubing has been lightened by the displacement of liquid therefrom at the ground surface to the extent that the flow of gas into the tubing has again reached a rate which causes the valve to close. This cycle then continues indefinitely.

Referring now to the operation of a well equipped with these valves when the string of tubing is being made up and lowered within the casing the valves 15 are installed at selected intervals. At this time the casing is usually partially filled with a liquid to a level above the uppermost valve 15. Gas is introduced through line 14 into the casing tubing annulus and forces the liquid level within the annulus downwardly which causes a rising of the liquid level within the string of flow tubing. This action is continued until the uppermost valve 15 has been exposed to the gas under pressure within the annulus. At this time the gas flows through the uppermost valve 15 and aerates the column of fluid within the string of tubing. By this means the upper portion of the static head of liquid is removed and the operation is continued until the second valve becomes exposed to the gas within the casing tubing annulus. At this time the valve 15 will usually be closed because the weight of the column of fluid within the tubing above the uppermost valve will be lightened to the extent that the flow through the valve will cause it to close. The original static head of liquid within the casing and tubing is thus dumped through successive stages down to the bottom or working valve. The working valve then operates to intermittently introduce a gas under pressure into a string of tubing in a cycle governed by the rate of flow of liquid from the well formation into the flow tubing through the liner at the bottom of the tubing string.

With regard to the modification shown in Fig. 4, a modified screen cap 40 is utilized which is relatively long compared to screen cap 18 of the Fig. 2 valve. This cap is perforated and provides a housing for the resilient element or spring 26. This spring is pressed between washer 41 at the upper end of stem 42 and the upper shoulder of nipple or partition 43.

The stem extends through the opening in partition 43 and carries a valve member 44 adapted to seat in the outlet 45a of valve head 45. The valve head also has a plurality of radial ports providing communication between the valve chamber 46 and the exterior of the valve.

The partition 43 has a plurality of bores of varying diameters through which stem 42 extends. The large diameter bore provides a power cylinder along with the bore of intermediate diameters and the stem carries a piston 47 operable within the power cylinder. Communication is provided between the power cylinder and the valve chamber by an axial passage 48 centrally of stem 42 and transverse passages 49, communicating with the passage 48. With the valve in its open position as shown in Fig. 4 the lower passage 49 is out of communication with either the power cylinder or the pressure chamber within the screen cap 40 as its ends reside within the portion of the partition bore having the least diameter. While this narrow portion of the bore does not restrict free movement of the stem nevertheless it substantially seals off the openings of the lower passage 49. However, as the pressure differential within the valve and pressure chambers cause slight axial movement of stem 42 the lower passage 49 is placed in communication with the valve chamber and together with the upper passage 49 and passage 48 establishes communication between the power cylinder and the valve chamber. This occurs just at the time that piston 47 enters the enlarged diameter portion of the bore of partition 43. This is effective to apply an increased force to stem 42 in the direction to close valve member 44.

The operation of this modification is so similar to that of the valve shown in Fig. 2 that it is believed apparent from the foregoing description and in the interest of simplicity further discussion of the operation will be dispensed with.

While the valve illustrated has been discussed in conjunction with its application to gas lift production of well fluid through the flow string of tubing, it is to be understood that the valve is also well adapted for use in conjunction with production through a macaroni string of tubing sometimes utilized in producing wells especially dual completion wells. Tubing strings known as macaroni or spaghetti strings are made up of small diameter pipe having an outside diameter in the neighborhood of 1" to 1¼" and is installed inside the flow tubing which usually has an O. D. of about 2" to 2½". The valves of this invention may be manufactured in an extremely small form having an overall length of approximately 4" or less and a maximum diameter of ¾" or less.

It will be seen that the objects of this invention have been accomplished. There has been provided a differential flow valve that operates with a snap action. The valves have great utility in gas lift production of oil well and may be economically manufactured in either very small or large sizes. The construction is such that the valve member and seat are not subjected to hammering due to too rapid closing of the valve and yet the closing is accomplished in a positive snap action manner. The arrangement is such that the valve member is not closed until a predetermined flow condition occurs over a very short but nevertheless finite period of time, thus eliminating the likelihood of accidental closure of the valve due to temporary flow conditions caused by surges, pulsations or the like.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described my invention, I claim:

1. In a differential flow valve having a housing with a valve chamber therein equipped with inlet and outlet ports and a valve member operable to close the outlet port, means continuously urging the valve member toward open position, and a pressure differential motor connected to the valve member and adapted to move the valve member to closed position in response to a selected pressure differential between the valve chamber and the exterior of the housing, said motor including a driving part exposed to said pressure differential when the valve member is in fully open position and a second driving part of relatively greater area exposed to only one of said pressures when the valve member is fully opened and to said pressure differential when the valve member has been moved a predetermined distance toward closed position.

2. In a differential flow valve having a housing with a valve chamber therein equipped with inlet and outlet ports and a valve member operable to close the outlet port, means continuously urging the valve member toward open position, and a pressure differential motor connected to the valve member and adapted to move the valve member to close position in response to a selected pressure differential between the valve chamber and the exterior of the housing, said motor including a driving part exposed to said pressure differential when the valve member is in fully open position and a second driving part of relatively greater area exposed to the pressure exterior of the housing when the valve member is in fully opened position, a passage operable with the valve member in a position at least a predetermined distance from fully opened position to communicate with the valve chamber and relieve the pressure from one side of the second driving part.

3. In a differential flow valve having a housing with a valve chamber therein equipped with inlet and outlet ports and a valve member operable to close the outlet port, means continuously urging the valve member toward open position, and a pressure differential motor connected to the valve member and adapted to move the valve member to closed position in response to a selected pressure differential between the valve chamber and the exterior of the housing, said motor including a driving part exposed to said pressure differential when the valve member is in fully open position and a second driving part of relatively greater area exposed only to the pressure exterior of the housing when the valve member is in fully opened position, a passage operable with the valve member in a position at least a predetermined distance from fully opened position to communicate with the valve chamber and relieve the pressure from one side of the second driving part, the flow characteristics of the passage being such as to relieve the pressure from one side of the second driving part at a predetermined rate.

4. In a differential flow valve a housing, a valve chamber and pressure chamber therein with an intermediate power cylinder, operable inlet and outlet ports for the valve chamber and an opening in the housing communicating between the pressure chamber and the exterior of the housing, a stem slidably mounted within the housing and extending through the chambers and cylinder and operable to substantially separate the valve and pressure chambers, a valve member on the stem adapted to seat in the outlet port and a piston element on the stem residing in and cooperable with the cylinder except when the stem and valve member are in fully open position, a passage between the valve chamber and cylinder and a closure for the passage operable upon movement of the stem to close the passage when the stem is in a position retaining the piston element out of the cylinder and to establish communication between the valve chamber and cylinder when the piston element is within the cylinder.

5. In a differential flow valve having a housing with a valve chamber therein, operable inlet and outlet ports for the chamber, a stem slidably extending into the chamber, a valve member carried by the stem and operable to close the outlet port, and means continuously urging the valve member toward open position, said stem presenting an effective pressure area within the chamber providing for actuation of the stem in response to the pressure differential between the exterior of the housing and the chamber the improvement which resides in the combination therewith of a cooperable cylinder and piston, the latter carried by the stem, the cylinder communicating with the pressure exterior of the housing when the valve member and stem are in extreme open position, the piston substantially closing this communication when the stem has moved the valve member a predetermined distance from full open position in a closing direction and means for establishing communication between the cylinder and valve chamber substantially simultaneously with breaking of communication between the cylinder and the exterior of the housing.

6. In a differential flow valve having a housing with a valve chamber therein, operable inlet and outlet ports for the chamber, a stem slidably extending within the chamber, said stem carrying a valve member operable to close the outlet port, and means continuously urging the valve member toward open position, said stem presenting an effective pressure area within the chamber providing for actuation of the stem in response to the pressure differentials between the chamber and the exterior of the housing, the improvement which resides in the combination therewith of a cooperable cylinder and piston, the latter carried by the stem, the cylinder communicating with the exterior of the housing when the valve member and stem are in extreme open position, the piston substantially closing this communication when the stem has moved the valve member a predetermined distance from full open position in a closing direction and means for establishing communication between the cylinder and valve chamber substantially simultaneously with breaking of communication between the cylinder and the exterior of the housing, to reduce the cylinder pressure at a predetermined rate.

7. In a differential flow valve having a housing with a valve chamber therein, operable inlet and outlet ports for the chamber, a stem slidably extending into the chamber, said stem carrying a valve member operable to close the outlet port, and means continuously urging the valve member toward open position, said stem presenting an effective pressure area within the chamber providing for actuation of the stem in response to the pressure differential between the chamber and the exterior of the housing, the improvement which resides in the combination therewith of a cooperable cylinder and piston, the latter carried by the stem, the cylinder communicating with the exterior of the housing when the valve member and stem are in extreme open position, the piston substantially closing this communication when the stem has moved the valve member a predetermined distance from full open position in a closing direction and a passage in the stem of predetermined length for establishing communication between the cylinder and valve chamber substantially simultaneously with entry of the piston into the cylinder.

8. In a differential flow valve having a housing with a valve chamber therein, operable inlet and outlet ports for the chamber, a stem slidably extending into the chamber, said stem carrying a valve member operable to close the outlet port and means continuously urging the valve member toward open position, said stem presenting an effective pressure area within the chamber providing for actuation of the stem in response to the pressure differential between the chamber and the exterior of the housing, the improvement which resides in the combination therewith of a cooperable cylinder and piston, the latter carried by the stem, the cylinder communicating with the exterior of the housing when the valve member and stem are in extreme open position, the piston substantially closing this communication when the stem has moved the valve member a predetermined distance from full open position in a closing direction and a passage in the stem of predetermined length and cross sectional area for establishing communication between the cylinder and valve chamber substantially simultaneously with entry of the piston into the cylinder to reduce the cylinder pressure at a predetermined rate.

9. In a differential flow valve a housing with spaced apart valve and pressure chambers therein, inlet and outlet ports for the valve chamber and an opening providing communication between the pressure chamber and the exterior of the valve, a stem slidably extending between the chambers and carrying a valve member operable to close the outlet, said stem having a part exposed to the pressure differential between the chambers, when the valve member is in substantially open position and an enlarged diameter part exposed to this pressure differential when the valve member is moved a small but finite distance toward the seat, whereby when the pressure differential between chambers is sufficient to move the stem and valve member said finite distance from open position in a direction to seat the valve member, the valve member is closed with a snap action.

10. A valve as in claim 9 wherein a resilient means urges the stem in a direction to open the valve.

11. A differential flow valve comprising a housing having a pressure chamber and a valve chamber formed therein, the pressure chamber communicating with the exterior of the valve, inlet and outlet ports for the valve chamber, an apertured partition between the chambers with an enlarged diameter open cylinder on the side remote from the outlet port, a stem slidably extending through the partition and cylinder carrying a valve member within the valve chamber operable to close the outlet port dependent upon the position of the stem, a piston carried by the stem within the pressure chamber, the piston spaced somewhat from the cylinder when the stem and valve member are in an extreme open position and adapted to move into the cylinder upon movement of the stem in a direction to seat the valve member, the stem having a portion substantially blocking the partition aperture when the valve member is in open position, and a grooved portion providing for flow of fluid therepast, the latter portion establishing communication between the cylinder and valve chamber when the piston resides within the cylinder whereby the piston is energized by the pressure differential between the chambers.

12. A differential flow valve comprising a housing having a pressure chamber and a valve chamber formed therein, the pressure chamber communicating with the exterior of the valve, inlet and outlet ports for the valve chamber, an apertured partition between the chambers with an enlarged diameter open cylinder on the side thereof remote from the outlet port, a stem slidably extending through the partition and cylinder carrying a valve member within the valve chamber operable to close the outlet port dependent on the position of the stem, a piston carried by the stem within the pressure chamber, the piston spaced somewhat from the cylinder when the stem and valve member are in an extreme open position and adapted to move into the cylinder upon movement of the stem in a direction to seat the valve member, the stem having a portion substantially blocking the partition aperture when the valve member is in open position, and another portion with a passage of predetermined cross sectional size providing for flow of fluid therepast at a predetermined rate, the latter portion establishing communication between the cylinder and valve chamber when the piston resides within the cylinder whereby the piston is energized by the pressure differential between the chambers.

HENRY U. GARRETT.

REFERENCES CITED

The following references are of record in the file of this patent:

UNITED STATES PATENTS

| Number | Name | Date |
|---|---|---|
| 821,859 | Clegg | May 29, 1906 |
| 2,307,949 | Phillips | Jan. 12, 1943 |